United States Patent
Takahashi et al.

(10) Patent No.: US 6,891,954 B2
(45) Date of Patent: May 10, 2005

(54) VEHICLE-MOUNTED NOISE CONTROL APPARATUS

(75) Inventors: Akira Takahashi, Tochigi-ken (JP);
Toshio Inoue, Tochigi-ken (JP);
Tsuyoshi Yamashita, Tochigi-ken (JP);
Hisashi Sano, Tochigi-ken (JP);
Kenichi Terai, Osaka-fu (JP); Hiroyuki Hashimoto, Osaka-fu (JP); Isao Kakuhari, Nara-ken (JP); Yoshio Nakamura, Osaka-fu (JP)

(73) Assignees: Honda Giken Kogyo Kabushiki Kaisha, Tokyo (JP); Matsushita Denkisangyo Kabushiki Kaisha, Osaka (JP)

( * ) Notice: Subject to any disclaimer, the term of this patent is extended or adjusted under 35 U.S.C. 154(b) by 699 days.

(21) Appl. No.: 09/819,718
(22) Filed: Mar. 29, 2001
(65) Prior Publication Data
US 2001/0026622 A1 Oct. 4, 2001

(30) Foreign Application Priority Data
Apr. 3, 2000 (JP) ........................................ 2000-100868

(51) Int. Cl.[7] .......................... A61F 11/06; H04B 1/00; H04R 29/00; H03G 3/20
(52) U.S. Cl. .......................... 381/71.4; 381/86; 381/56; 381/57
(58) Field of Search ...................... 381/86, 71.1, 71.4, 381/56–57, 94.1, 120; 455/334, 341; 330/10, 251, 207 A

(56) References Cited
U.S. PATENT DOCUMENTS
5,371,802 A * 12/1994 McDonald et al. ........ 381/71.4
5,469,510 A * 11/1995 Blind et al. .................. 381/55
6,675,232 B1 * 1/2004 Sato et al. ..................... 710/8

FOREIGN PATENT DOCUMENTS
JP           05-011779           1/1993

* cited by examiner

Primary Examiner—Forester W. Isen
Assistant Examiner—Laura A. Grier
(74) Attorney, Agent, or Firm—Arent Fox PLLC

(57) ABSTRACT

In an active noise control apparatus in which an audio signal and a noise control signal are mixed to thereby sound a loudspeaker inside a motor vehicle, a general-purpose audio head unit cannot conventionally be freely changed for the one already mounted on the motor vehicle. As a solution, an active noise control unit is provided with a buffer amplifier and a mixer. An audio signal amplified by a power amplifier in an audio head unit is adjusted in level by the buffer amplifier such that a level of an audio signal outputted after amplification by the first amplifier becomes substantially equal to a level of the audio signal outputted from the audio head unit. Then, at the mixer, a noise control signal outputted from an active noise controller is added to an audio signal outputted from the buffer amplifier. Therefore, any audio head unit can be freely changed for the one already mounted on the vehicle as long as the audio head unit contains therein a power amplifier.

10 Claims, 1 Drawing Sheet

VEHICLE-MOUNTED NOISE CONTROL APPARATUS

BACKGROUND OF THE INVENTION

1. Field of the Invention

The present invention relates to a vehicle-mounted noise control apparatus for actively removing an effect of noises from outside a cabin of a motor vehicle.

2. Description of Related Art

As this kind of vehicle-mounted noise control apparatus, there has hitherto been known the following in International Publication No. WO 90/09655. Namely, in the apparatus, an audio signal which is outputted from an audio system such as a radio tuner, a cassette deck, or the like is amplified to a certain level. A noise control signal from an active noise control means is added to the amplified audio signal. The audio signal having the noise control signal added thereto is further amplified to thereby drive a loudspeaker. The active noise control means performs the following function as disclosed in Japanese Published Unexamined Patent Application No. 3084/1999. Namely, a noise from outside a motor vehicle is converted into a noise signal which is in the form of an electric signal. A signal which is obtained by filtering the noise signal through an adaptive filter is used as a control signal to thereby drive a control loudspeaker. The sound from the control loudspeaker is converted by an error detector into an error signal which is in the form of an electric signal. By using the adaptive filter, the error signal is arranged to become minimum all the time in response to the changes in the noise.

Therefore, if the control signal is outputted from a noise control means as the noise control signal and is further added to the audio signal as explained herein above, the noise can be aurally reduced by the noise control signal when music or the like is sounded from the loudspeaker.

In the vehicle-mounted noise control apparatus disclosed in the above International Publication No. WO 90/09655, there is a disclosure about how the connections are made among the constituting elements such as the audio system, the active noise control means, the amplifiers, mixing means, or the like. However, there is no disclosure about a concrete constitution of units each of which is made up of one or more constituting elements. Therefore, in case the active noise control apparatus as described in the above International Publication is carried into effect, there may be considered a constitution in which each of the constituting elements such as the audio system, the active noise control means, or the like is contained inside a single unit. On the other hand, various kinds of audio head units containing therein a radio tuner, a cassette deck, and other audio systems are put on the market for independent sale. It is therefore commonly practiced for a user to change those as originally mounted on a vehicle for other types which suit his own taste. If all of the constituting elements are contained inside a single unit as described above, there is a disadvantage in that they cannot be changed for a new audio head unit.

In view of the above disadvantage, the present invention has an object of providing a vehicle-mounted noise control apparatus in which the audio head unit can be replaced by the user.

SUMMARY OF THE INVENTION

In order to attain the above and other objects, the present invention is a vehicle-mounted noise control apparatus having: an active noise control unit for generating a noise control signal which reduces noises from outside and for outputting the noise control signal after amplification by a first power amplifier; and a replaceable audio head unit for outputting an audio signal from an audio system after amplification by a second power amplifier, characterized in that the active noise control unit further comprises: a buffer amplifier for adjusting a gain of the audio signal, when an amplified audio signal outputted from the audio head unit is inputted into the active noise control unit, such that a level of an audio signal outputted after amplification by the first amplifier becomes substantially equal to a level of the audio signal outputted from the audio head unit; and a mixing means for adding the noise control signal before amplification to a gain-adjusted audio signal outputted from the buffer amplifier for further outputting to the first amplifier.

According to the above-described arrangement, even if the audio head unit is replaced by another one, the level of the audio signal which is outputted after amplification by the first power amplifier in the active noise control unit becomes substantially equal to the level of the output signal which is outputted from an audio head unit when taken or considered independently. Therefore, the audio head unit can be freely replaced.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
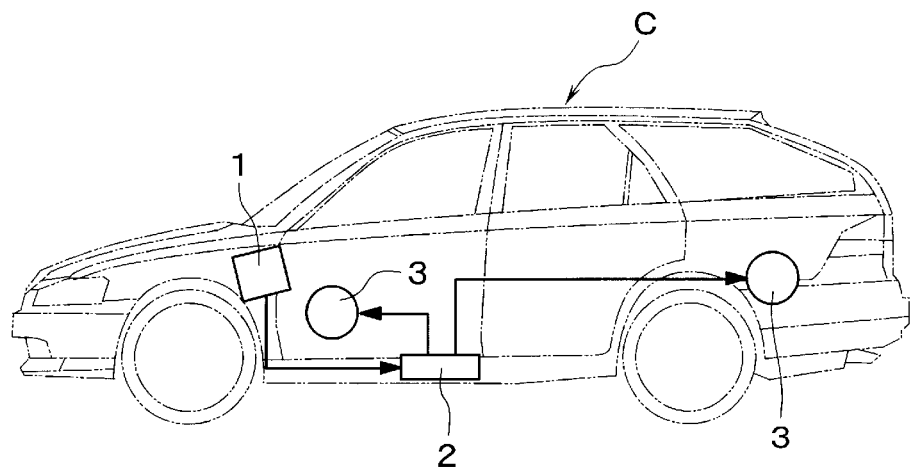
FIG. 1 is a schematic diagram showing one embodiment of the vehicle-mounted noise control apparatus according to the present invention.
Figure 2:
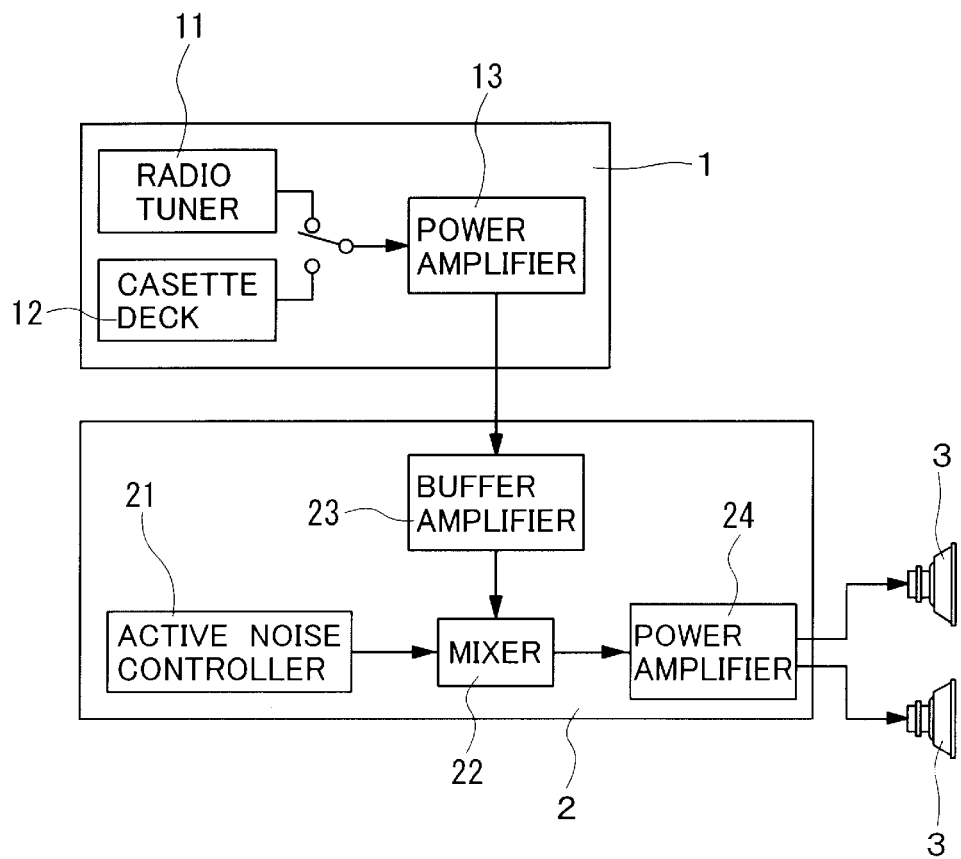
FIG. 2 is a block diagram showing an arrangement of the embodiment in FIG. 1.

With reference to FIGS. 1 and 2, reference numeral 1 denotes an audio head unit which is mounted in advance in the neighborhood of a console of a motor vehicle C, at the time of delivery thereof from a vehicle manufacturing factory. Inside the audio head unit 1, there are contained a radio tuner 11 and a cassette deck 12, both constituting an audio system. In this example, the audio system to be contained inside the audio head unit 1 is made up of two items of the radio tuner 11 and the cassette deck 12. They may, of course, be changed for, or supplemented by, another audio system such as a compact disc (CD) player, a minidisk (MD) player, or the like. The audio head unit which is usually sold on the market contains therein a power amplifier to enable to independently sound or drive loudspeakers 3, 3. Therefore, in the audio head unit 1 of this example, there is also contained a power amplifier 13.

Under a driver's seat there is disposed an active noise control unit 2. Inside the active noise control unit 2, there is contained an active noise controller 21 which is made up of a circuit for outputting a noise control signal which actively reduces noises from outside a cabin of the motor vehicle. As such noises, there are those generated in an engine room of the motor vehicle, those generated between wheels of the running motor vehicle and a road surface, or the like. Since the noise control signal which is outputted from the active noise controller 21 is small in its level, it must be amplified to a predetermined level in order to enable to sound loudspeakers 3, 3. For that purpose, another power amplifier 24 is contained inside the active noise control unit 2. Wiring is thus made so that the signal amplified by the power amplifier 24 is supplied to the loudspeakers 3, 3.

Inside the active noise control unit 2, there is contained a buffer amplifier 23. This buffer amplifier 23 performs a gain adjustment such that the amplification of a signal to be outputted through three elements of the buffer amplifier 23, a mixer 22 which serves as a mixing means to be described hereinafter, and the power amplifier 24 becomes substantially 1. In other words, a gain adjustment is made such that an audio signal which is of substantially the same level as that of the audio signal to be inputted into the buffer amplifier 23 is outputted from the power amplifier 24. The mixer 22 is interposed on an upstream side of the power amplifier 24. The noise control signal outputted from the active noise controller 21 is added to the audio signal whose level has been adjusted by the buffer amplifier 23. The signal which has been processed in this manner is inputted into the power amplifier 24. By employing the above-described arrangement, reverse-phase noises which reduce the noises are sounded together with the music or the like from the loudspeakers 3, 3, with the result that noise control effect can be obtained. In addition, since the amplification of the signal to be outputted through the three elements of the buffer amplifier 23, the mixer 22, and the power amplifier 24 becomes substantially 1, the driver of the vehicle can arbitrarily choose the volume level of the sound from the audio unit without keeping in mind the fact that the active noise control unit is coupled, irrespective of the output of the replaced audio head unit.

The audio head unit 1 according to the present embodiment contains therein the power amplifier 13 like in many other audio head units put on the market. When the user replaces the audio head unit 1 by another audio head unit, he can select a new audio head unit from among those containing therein a power amplifier. After physical replacement of the audio head unit, he simply need to electrically connect the new audio head unit to the buffer amplifier 23.

As can be seen from the above-described explanations, according to the present invention, the active noise control unit contains therein: a buffer amplifier for adjusting the gain of the audio signal such that the audio signal of the same level as that of the audio signal from the audio head unit is outputted from the active noise control unit; and a mixer for mixing the gain-adjusted audio signal and the noise control signal together. Therefore, the user can select an appropriate audio head unit out of many kinds of audio head units each containing therein a power amplifier, and he can freely replace the audio head unit. Once the audio head unit has been replaced, the volume knob or the like of the replaced audio head unit can be operated without taking note of the fact that the active noise control unit is coupled thereto.

It is readily apparent that the above-described vehicle-mounted noise control apparatus meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A vehicle-mounted noise control apparatus comprising
an active noise control unit for generating a noise control signal which reduces noises from outside and for outputting the noise control signal after amplification by a first power amplifier; and
a replaceable audio head unit for outputting an audio signal from an audio system after amplification by a second power amplifier,
wherein said active noise control unit further comprises:
a buffer amplifier for adjusting a gain of the audio signal, when an amplified audio signal outputted from said audio head unit is inputted into said active noise control unit, such that a level of an audio signal outputted after amplification by said first amplifier becomes substantially equal to a level of the audio signal outputted from said audio head unit; and
a mixing means for adding the noise control signal before amplification to a gain-adjusted audio signal outputted from said buffer amplifier for further outputting to said first amplifier,
wherein said first power amplifier, said buffer amplifier, and said mixing means are disposed within said active noise control unit.

2. The noise control apparatus according to claim 1, wherein said active noise control unit further comprises an active noise controller.

3. The noise control apparatus according to claim 2, wherein said active noise controller comprises a circuit that outputs the noise control signal.

4. The noise control apparatus according to claim 3, wherein said mixing means is disposed on an upstream side of said first power amplifier.

5. The noise control apparatus according to claim 3, wherein said active noise controller is disposed on a first upstream side of said mixing means.

6. The noise control apparatus according to claim 5, wherein said buffer amplifier is disposed on a second upstream side of said mixing means.

7. The noise control apparatus according to claim 2, wherein said mixing means is disposed on an upstream side of said first power amplifier.

8. The noise control apparatus according to claim 2, wherein said active noise controller is disposed on a first upstream side of said mixing means.

9. The noise control apparatus according to claim 8, wherein said buffer amplifier is disposed on a second upstream side of said mixing means.

10. The noise control apparatus according to claim 1, wherein said mixing means is disposed on an upstream side of said first power amplifier.

* * * * *